United States Patent
Hargreaves

(10) Patent No.: US 7,152,225 B2
(45) Date of Patent: Dec. 19, 2006

(54) IDENTIFYING A KERNEL STRUCTURE USING AN ELEMENT AND A VARIABLE OFFSET OF THE STRUCTURE FROM DEBUGGING

(75) Inventor: Alan Hargreaves, Mardi (AU)

(73) Assignee: Sun Microsystems, Inc., Santa Clara, CA (US)

( * ) Notice: Subject to any disclaimer, the term of this patent is extended or adjusted under 35 U.S.C. 154(b) by 591 days.

(21) Appl. No.: 10/373,977

(22) Filed: Feb. 25, 2003

(65) Prior Publication Data

US 2004/0168161 A1 Aug. 26, 2004

(51) Int. Cl.
G06F 9/44 (2006.01)
(52) U.S. Cl. .................. 717/124; 717/129
(58) Field of Classification Search ............ 717/124, 717/129; 714/799, 824
See application file for complete search history.

(56) References Cited

U.S. PATENT DOCUMENTS

| | | | | | |
|---|---|---|---|---|---|
| 5,394,544 | A | * | 2/1995 | Motoyama et al. | 714/31 |
| 5,465,365 | A | * | 11/1995 | Winterbottom | 707/101 |
| 5,630,049 | A | * | 5/1997 | Cardoza et al. | 714/25 |
| 5,771,385 | A | * | 6/1998 | Harper | 717/128 |
| 6,016,555 | A | * | 1/2000 | Deao et al. | 714/35 |
| 6,493,868 | B1 | * | 12/2002 | DaSilva et al. | 717/105 |
| 6,516,408 | B1 | * | 2/2003 | Abiko et al. | 712/227 |
| 6,681,348 | B1 | * | 1/2004 | Vachon | 714/45 |
| 6,988,264 | B1 | * | 1/2006 | Sarma et al. | 717/128 |

OTHER PUBLICATIONS

How Debuggers Work, Jonathan B. Rosenberg, Chapters 1-12, 1996.*

Compilers Principles, Techniques and Tools, Aho et al, Sep. 12, 1985, pp. 429-440.*

Mesa Debugger Documentation, Version 5.0 Apr. 1979, Xerox Whole Manual.*

Working in GDB A Guide to the Internals of the GNU Debugger, John Gilmore et al, whole manual , 1994.*

Borland Turbo Debugger User's Guide, version 2.5, 1991, pp. 119,141-147, 239, 302-309, 358-359,374-378,387-390,394-395,421, 423,426.*

Borland Turbo Debugger User's Guide, version 3.0, 1991, pp. 125-152.*

"Understanding the Linux Kernel, $2^{nd}$ Edition", Daniel P. Bovet et al, Dec. 2002, 3 pages.*

Windows 2000 Kernel Debugging, Steven Mc Dowell, pp. vii-30,69-126,137-147, Jan. 5, 2001.*

Microsoft Symbol and Type Information, Version 1.0 , Tool Interface Standard, no date.*

Implementation Loadable Kernel Modules for Linux, Dr. Dobbs Journal, Jul. 2001, 11 pages.*

* cited by examiner

*Primary Examiner*—Todd Ingberg
(74) *Attorney, Agent, or Firm*—William J. Kubida; Michael C. Martensen; Hogan & Hartson LLP

(57) ABSTRACT

A system and method for determining a structure within a software kernel using an offset and an element is disclosed. The software kernel is received from a third party for debugging operations. Given one or more element and offset pairs, data extracted from the software kernel is searched to produce a list of possible structures to provide additional information during the debugging operations. The data is extracted into tables with symbol table information. The symbol table information is searched using an offset and an element. Structures are identified using this information and, optionally, a structure size may be provided to further limit the possible structures.

20 Claims, 3 Drawing Sheets

IDENTIFYING A KERNEL STRUCTURE USING AN ELEMENT AND A VARIABLE OFFSET OF THE STRUCTURE FROM DEBUGGING

BACKGROUND OF THE INVENTION

1. Field of the Invention

The present invention relates to systems and methods for querying and debugging software and, more particularly, the invention relates to systems and methods for querying and debugging software kernels using an offset and an element to determine additional information about a software structure.

2. Discussion of the Related Art

In debugging operations, software may be received from third party sources. The software is loaded into a debugging system to perform queries, searches, identification, troubleshooting and the like. Specific information regarding structures within the software may be queried and identified if the user has the address of the structure. Other searches using information that does not have the structure address may be desirable.

SUMMARY OF THE INVENTION

Accordingly, the present invention is directed to a system and method for determining a structure within a software kernel using an offset and an element.

Additional features and advantages of the invention will be set forth in the disclosure that follows, and in part will be apparent from the description, or may be learned by practice of the invention. The objectives and other advantages of the disclosed embodiments may be realized and attained by the structure particularly pointed out in the written description and claims hereof as well as the appended drawings.

To achieve these and other advantages and in accordance with the purpose of the present invention, as embodied and broadly described, a method for determining a structure within a software kernel is disclosed. The method includes determining an offset and element of the structure. The structure is from a plurality of structures within the software kernel. The method also includes searching symbol table data according to the offset and the element. The method also includes identifying the structure from the symbol table data.

Further disclosed herein is a system for debugging software, wherein a memory store includes a plurality of structures within a software kernel. The system comprises a debugger to access the software kernel and a structure derived from the plurality of structures, with the structure having an offset and an element. The system further comprises symbol table data for the software kernel, comprising information regarding the structure, and a query for the symbol table data comprising the offset and the element to identify the structure. Also disclosed herein is a system for determining a structure within a software kernel in a debugging environment wherein the system comprises means for determining an offset and element of the structure, wherein the structure is one of a plurality of structures within the software kernel, means for searching symbol table data according to the offset and the element and means for identifying the structure from the symbol table data.

Still further disclosed herein is a method for querying software having structures which comprises the steps of compiling a symbol table data file for a software kernel, debugging the software kernel, searching the symbol table data file using an offset and an element determined from the debugging operation, identifying potential structures for the offset and the element and determining a structure from the potential structures. Also disclosed herein is a method for searching symbol table information to determine possible structures which comprises matching an index comprising an offset and a type, creating a first list of parent types according to the index, and creating a second list of possible structures according to the index and the first list.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the disclosed embodiments of the present invention, examples of which are illustrated in the accompanying drawings.

Figure 1:
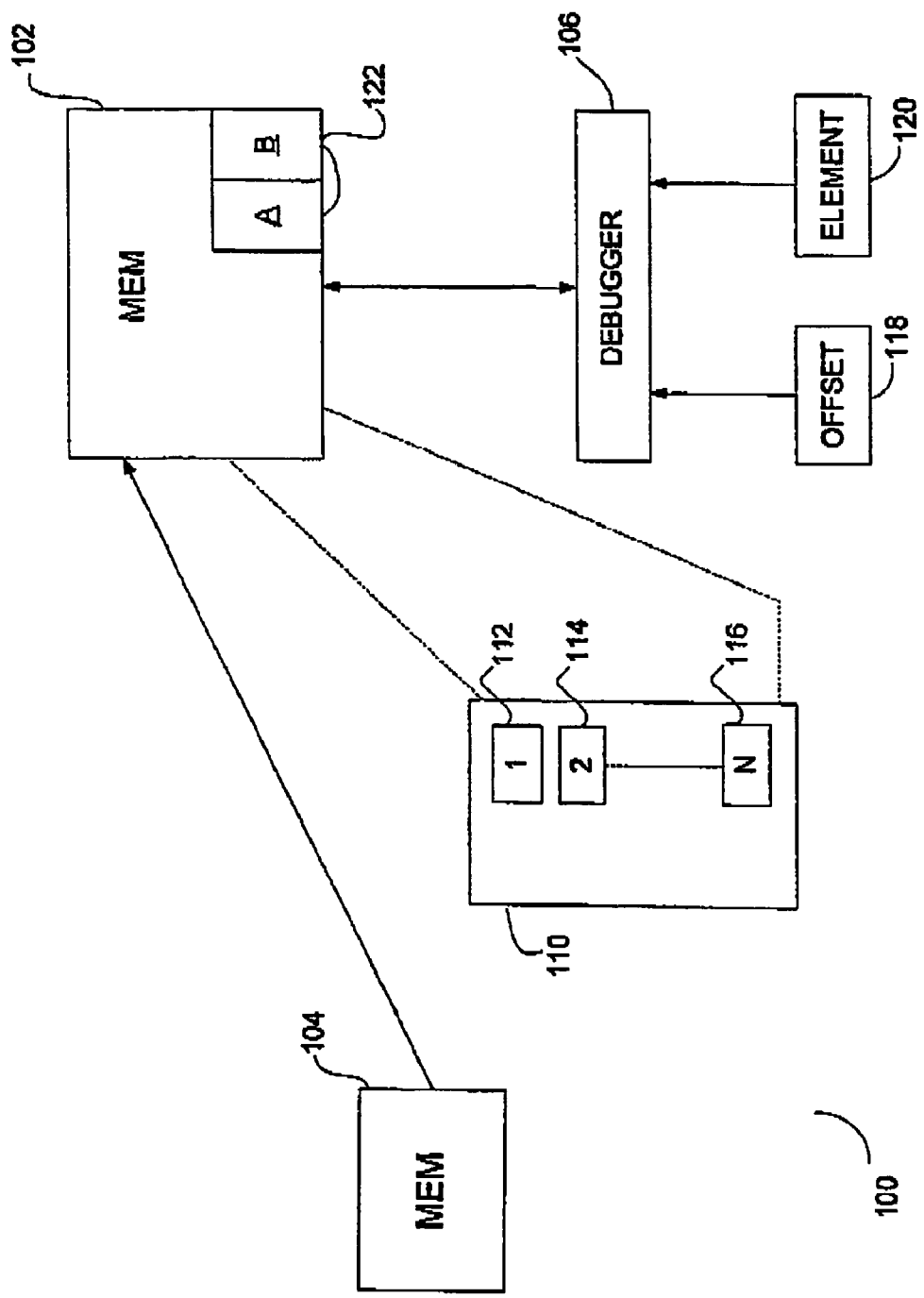
FIG. 1 illustrates a system for software debugging operations according to the disclosed embodiments.

FIG. 1 depicts a system 100 for software debugging operations according to the disclosed embodiments. System 100 may be implemented over a network or any other configuration that exchanges data or information. System 100 includes memory 102 and memory 104. Memories 102 and 104 may be coupled over the network of system 100. Memory 104 may store a software program that is transferred to memory 102. Memory 104 may be known as a third party source that is storing a program. The program in memory 104 may be in assembly code, wherein the source code is not readily available. The software program may be transferred, or copied, and stored in memory 102.

Within memory 102, the software program may be known as software kernel 110. Software kernel 110 may be independent, or part of additional software stored within memory 102. Debugging operations may be performed on software kernel 110 using debugger 106. Debugger 106 may include software code stored on a device having memory 102. Alternatively, debugger 106 may be stored elsewhere and accesses memory 120 over the network of system 100. Preferably, debugger 106 facilitates software testing and debugging of software kernel 110.

Memory 102 may be a database. Alternatively, memory 102 may be any medium capable of storing data, preferably blocks of software code or programs. Memory 102 may be accessible to debugger 106. Software kernel 110 may comprise structures 112, 114, and 116. There may be any number of structures within software kernel 110, with structure 116 being the Nth structure. Structures may be identified within software kernel 110 by their address location. If one knows the address of the structure, such as structure 112, then the values, structure types and other information may be available. Structures within software kernel 110 also may have names. Structures also may have offsets within them to certain addresses and locations within the structure.

Memory location 102 may include symbol table information 122 that is compiled from software kernel 110. Symbol table information 122 may define every structure within software kernel 110. Symbol table information 122 may be created by debugger 106 prior to debugging operations. Alternatively, symbol table information 122 may be created when software kernel 110 is loaded onto memory 102. Further, symbol table information 122 may include data that is parsed and loaded onto memory 102.

Further, symbol table information 122 may comprise two tables A and B. Table A may be known as the type table and may contain two elements. The first element may be a type name that provides the ASCII name of the type. Type name may be used for final display and for initial translation to a type index. The second element may be the type index that is a unique index associated with a particular symbol table information 122 entry. If symbol table information 122 uses a single number as the index, then this element may be used. If symbol table information 122 uses a tuple, then an index may need to be some unique combination of the values of that tuple.

Table B may be known as the element table, and may contain the structure element information. Every substructure may be expanded into this table in order to be able to provide quick lookup. One feature may be an offset that provides the offset into the parent structure. Another feature may be a type index that provides an index into the type table, or Table A, for the supplied type/offset. Another feature may be a parent type index that provides an index into the type table, or Table A, for the parent type. The parent type index may be used to get the printable name of the parent type when results are displayed. Another feature may be size that provides the size of the parent type. Size may be used when a size is specified in order to limit the search. This is a replication of information, but housing the size here provides a faster or simpler lookup.

The data may be read into the above-disclosed tables by methods and means known to those skilled in the art. All substructures should be expanded. The tables may be sorted in any known manner, including using the offset as the primary sort key and structure size as a secondary sort key. The search routine may be passed as an optional structure size and a list of type index or offset tuples.

Debugger 106 may query memory 102, software kernel 110, or symbol table information 122 for information on structures within software kernel 110. Typically, if given the base structure name, then the data may be displayed in the structure format. According to the disclosed embodiments, given an offset into a base structure and the type at that offset, then the actual structure and its corresponding information may be retrieved.

Offset 118 and element 120 may pertain to a specific structure within software kernel 110. For example, offset 118 and element 120 may correspond to structure 114. Offset 118 is the difference between the start of structure 114 and a variable of interest. Element 120 may be another feature of structure 114, such as structure type, a value within structure 144, structure name, and the like. Using this information, the disclosed embodiments may determine structure 114 and additional information about structure 114, such as values, other elements, structure type, address, and the like.

For example, element 120 may be a known type of argument to a well documented kernel function is a pointer to structure 114, wherein structure 114 is a particular type of structure. Further, it is determined that the pointer is stored at an offset of 8 bytes into the structure, and this may be the value for offset 118. Using offset 118 and element 120, a list of possible structures may be retrieved from searching symbol table information 122 to find out more about how structure 114, such as the context of the call that is being made.

Thus, given one or more type/offset pairs, symbol table information 122 may be scanned to produce a list of possible structures. The search may be limited further by providing the size of the structure. Type, offset, and size are often available to a user while performing a crashdump analysis during debugging operations. This functionality may allow the user to list a number of possibilities for a structure type. This feature may be especially useful in dealing with drivers/code for which the source code is not available, and the third party is using types and structures that are known.

Figure 2:
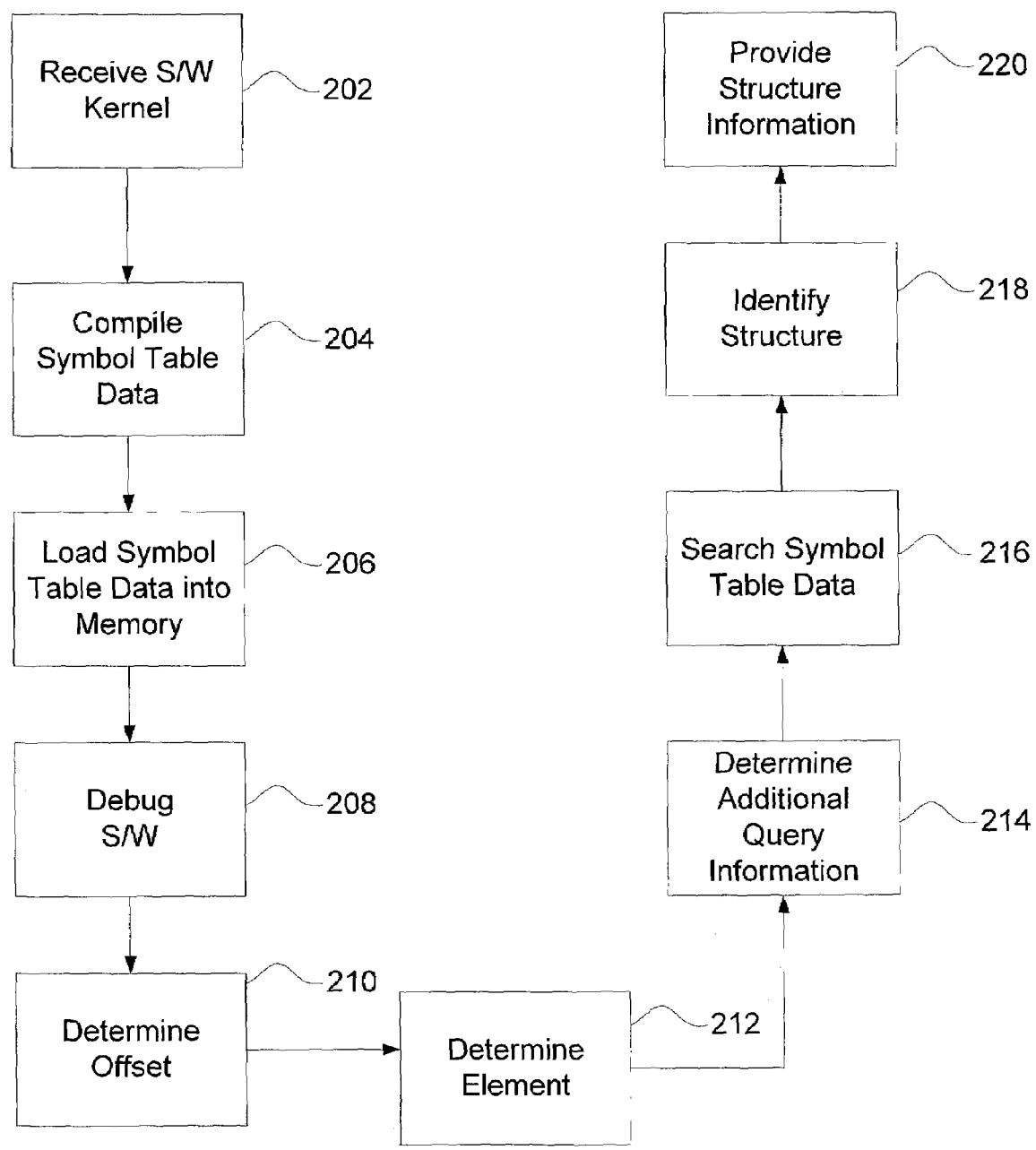
FIG. 2 illustrates a flowchart for querying software to determine software structure information according to the disclosed embodiments.

FIG. 2 depicts a flowchart for querying software to determine software structure information according to the disclosed embodiments. The steps disclosed in conjunction with FIG. 2 effectively implement the SQL statement:

SELECT Parent from a.Elements,b.Elements[, . . . ] where
a.size=size and
a.type=type1 and
a.offset=offset1 and
b.type=type2 and
b.offset=offset2 and
. . . and
a.parent=b.parent and
b.parent=c.parent and
. . .

Step 202 executes by receiving a software kernel at a memory coupled to a debugger. The debugger performs debug and testing operations on the software kernel. The software kernel may be from a third party and in an assembly code format. The source code for the software kernel may not be readily available. The software kernel is stored in the memory by any known method, means, operations, and the like. While stored, the software kernel should be accessible by the debugger.

Step 204 executes by compiling a symbol table data for a file comprising symbol table information. Symbol table data may define every structure within the software kernel. The symbol table information may be searchable, and may receive queries regarding the data within the file. Step 206 executes by loading the symbol table data into memory. The file for the symbol table data may be stored within the memory holding the software kernel. Alternatively, the symbol table information may be stored in another location. Furthermore, the symbol table information may be attached to the software kernel.

Step 208 executes by debugging the software kernel using commands, applications, operations, and the like from the debugger disclosed above. The software kernel may be debugged by running integrity applications, or executing the kernel itself. While debugging, various calls to address locations within the software kernel may be encountered. A user may desire additional information regarding the structure encompassing the call location. Debugging operations may be made using the symbol table data as opposed to the software kernel itself.

Step 210 executes by determining an offset into a structure of interest from the debugging operations. The offset may be the difference between the location or variable of interest and the start of the structure. Step 212 executes by determining the value of another element of the structure. Elements are disclosed above, and may include a function, variable, structure type and the like. Step 214 executes by determining any additional query information that may be useful in identifying the structure.

Step 216 executes by searching the symbol table data using the offset, the element, and any other additional information. Step 218 executes by identifying the structure having the offset and the element within the software kernel. If more than one structure is identified, then the user may view the potential structures and select structures to review. Step 220 executes by providing the additional information for the structure, such the type of structure, values, variables, and the like.

Figure 3:
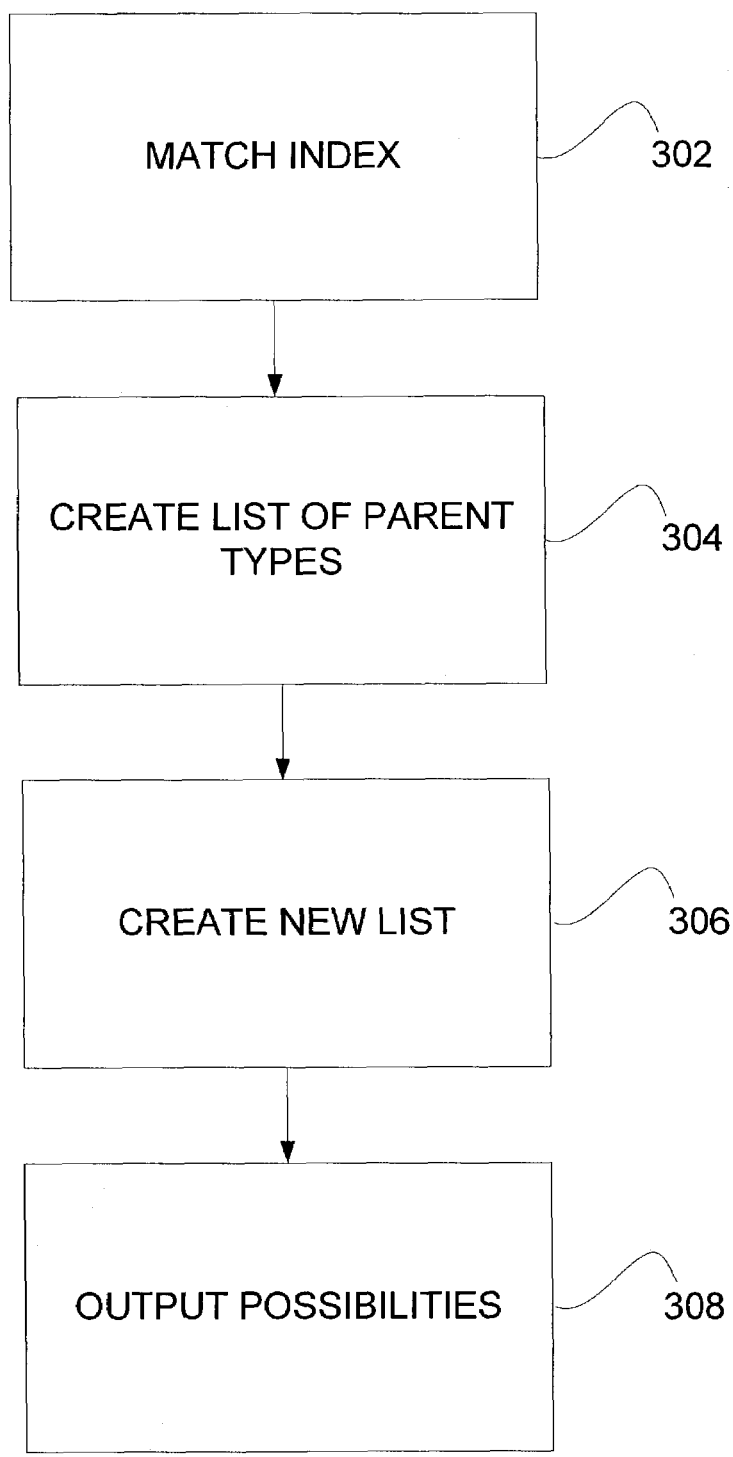
FIG. 3 illustrates a flowchart for searching symbol table information to determine possible structures according to the disclosed embodiments.

FIG. 3 depicts a flowchart for searching symbol table information to determine possible structures according to the disclosed embodiments. Step 302 executes by matching an index having a type and an offset to possible parent types. Step 304 executes by creating a list of parent types that match the index. If a size is used, then size may be part of the index to eliminate possibilities. Step 306 executes by creating a new list that matches each type and offset passed in with the type and offset that exists in the previous list 304. Step 306 is applied iteratively to this list for each type/offset pair in order to discard potential matches that do not meet all of the supplied criteria. Step 308 executes by outputting the possibilities for the structures identified. Preferably, the list of possibilities should be short.

The disclosed embodiments may be implemented as an application stored in a memory located on the debugger, another computer, and the like. The software kernel and the symbol table data may be stored in a database. The code for the software kernel is received from a third party. The code is placed into a memory to be searched, queried, debugged and the like. The user is interested in aspects of the code, and may not have the source code to reference. The file for the symbol table information is created, and is searchable. Queries for structure information may be formed using an offset and an element, when address location for the structure is not available or known.

It will be apparent to those skilled in the art that various modifications and variations can be made without departing from the spirit or scope of the invention. Thus, the disclosed embodiments cover the modifications and variations of this invention provided that they come within the scope of any claims and their equivalents.

What is claimed:

1. At least one computer-readable medium containing a computer program product for determining a particular structure within a software kernel having a plurality of structures, the computer program product comprising: program code for determining an offset and an element of the particular structure, storing the offset and element in memory, wherein the offset is a difference between a start of the particular structure and a variable and the element is a feature of the particular structure other than the variable; program code for searching symbol table data that defines the plurality of structures in the software kernel according to the stored offset and the element; and program code for identifying the particular structure from a set of the symbol table data found in the searching of the symbol table data.

2. The computer-readable medium of claim 1, further comprising program code for compiling the symbol table data from the software kernel.

3. The method computer-readable medium of claim 1, further comprising program code for loading the symbol table data.

4. The method computer-readable medium of claim 1, further comprising program code for loading the software kernel.

5. The computer-readable medium of claim 4, further comprising program code for accessing the software kernel via a debugger coupled to the memory.

6. The computer-readable medium of claim 1, further comprising program code for providing additional information about the identified structure.

7. The computer-readable medium of claim 1, further comprising program code for determining a set of structures potentially having the offset and the element, wherein the identified structure is selected from the set of structures.

8. The computer-readable medium of claim 1, further comprising program code for debugging the software kernel.

9. A computer system for debugging software, wherein a memory store includes a plurality of structures within a software kernel, the computer system comprising: a software portion configured to access the software kernel in the memory store via a debugger; a software portion configured to form a structure from the plurality of structures, the structure having an offset and an element, wherein the offset is a difference between a start of the structure within the software kernel and a variable and the element is a feature of the structure other than the variable; storing the offset and element in memory, a software portion configured to define kernel that defines the plurality of the structures in the software kernel using symbol table data for the software kernel; and a software portion configured to query means query the symbol table data using a query built from the stored offset and the element to identify a subset of the plurality of the structures that satisfy the query, the subset including the structure.

10. The system of claim 9, further comprising another memory coupled to the memory store to provide the software kernel and wherein the element is selected from the group of features for the structure consisting of structure type, a value within the structure, structure name, and values.

11. The system of claim 9, wherein querying means is provided in the debugger and comprises an application to query the symbol table data using the offset and the element.

12. The system of claim 9, wherein the query includes additional information regarding the structure.

13. A computer system for determining a structure within a software kernel in a debugging environment, comprising: a software portion configured to determine offset and element of the structure by storing the offset and element in memory, wherein the structure is from a plurality of structures within the software kernel; a software portion configured to search means symbol table data according to the stored offset and the element; and a software portion configured to identify identifying the structure from the symbol table data.

14. The system of claim 13, further comprising a software portion configured to compile the symbol table data from the software kernel.

15. The system of claim 13, further comprising a software portion configured to provide additional information about the identified structure.

16. A computer implemented method for querying software having structures, the method comprising: compiling a symbol table data file for a software kernel to provide information on each of the structures in the software kernel;

debugging the software kernel including locating a variable or location or interest in one of the structures in the software kernel; searching the symbol table data file using an offset to the variable or location in the one of the structures and an element in the one of the structures determined from the debugging; identifying potential structures for the offset and the element based on the searching; and determining a structure from the potential structures and storing structure information in memory.

17. The method of claim 16, further comprising loading the symbol table data file for accessible during the debugging.

18. The method of claim 16, further comprising providing additional information about the structure.

19. A computer implemented method for searching symbol table information defining a plurality of structures of a kernel to determine possible structures, the method comprising: matching an index comprising an offset and a type, wherein the offset is a difference between a start of one of the structures and a variable; creating a first list in memory of parent types according to the index; and creating a second list in memory of possible structures by processing the first list using a size of the one of the structures.

20. The method of claim 19, comprising outputting the second list.

* * * * *

UNITED STATES PATENT AND TRADEMARK OFFICE
CERTIFICATE OF CORRECTION

PATENT NO.        : 7,152,225 B2
APPLICATION NO. : 10/373977
DATED             : December 19, 2006
INVENTOR(S)       : Alan Hargreaves It is certified that error appears in the above-identified patent and that said Letters Patent is hereby corrected as shown below:

Column 6, line 1, delete "method"

Column 6, line 4, delete "method"

Column 6, line 30, delete "kernel that defines"

Column 6, line 32-33, delete "means query"

Column 6, line 54, delete "means"

Column 6, line 56, delete "identifying"

Column 7, line 11, "accessible" should be --accessibility--

Signed and Sealed this

Twenty-fourth Day of April, 2007

JON W. DUDAS
*Director of the United States Patent and Trademark Office*